US006480301B1

(12) United States Patent
Cholewo

(10) Patent No.: US 6,480,301 B1
(45) Date of Patent: Nov. 12, 2002

(54) METHOD AND APPARATUS FOR GAMUT BOUNDARY DETERMINATION

(75) Inventor: Tomasz Jan Cholewo, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/440,627

(22) Filed: Nov. 15, 1999

(51) Int. Cl.$^7$ ............................................. G06F 15/00
(52) U.S. Cl. ..................... 358/1.9; 358/520; 358/537
(58) Field of Search ........................... 358/1.1, 1.5, 1.6, 358/1.9, 1.11, 1.12, 1.13, 1.14, 1.15, 1.16, 504, 515, 519, 520–525, 537

(56) References Cited

U.S. PATENT DOCUMENTS

| | | | |
|---|---|---|---|
| 5,343,311 A | 8/1994 | Morag et al. | 358/518 |
| 5,390,035 A | 2/1995 | Kasson et al. | 358/518 |
| 5,416,890 A | 5/1995 | Baretta | 395/131 |
| 5,510,910 A | 4/1996 | Bockman et al. | 358/502 |
| 5,519,515 A | 5/1996 | Komatsu | 358/518 |
| 5,625,378 A | 4/1997 | Wan et al. | 345/150 |
| 5,704,026 A | 12/1997 | Wan | 395/131 |
| 5,721,572 A | 2/1998 | Wan et al. | 345/431 |
| 5,731,818 A | 3/1998 | Wan et al. | 345/431 |
| 5,734,745 A | 3/1998 | Ohneda | 382/167 |
| 5,740,076 A | 4/1998 | Lindbloom | 364/514 R |
| 5,748,858 A | 5/1998 | Ohtsuka et al. | 395/109 |
| 5,767,992 A | 6/1998 | Tanaka et al. | 358/520 |
| 5,801,854 A | 9/1998 | Naylor, Jr. | 358/518 |
| 5,809,213 A * | 9/1998 | Bhattacharjya | 358/1.6 |
| 5,815,642 A | 9/1998 | Kumada | 395/109 |
| 5,850,229 A | 12/1998 | Edelsbrunner et al. | |
| 5,872,898 A | 2/1999 | Mahy | 395/109 |
| 6,268,930 B1 * | 7/2001 | Ohta et al. | 358/1.9 |

OTHER PUBLICATIONS

Balasubramanian, R., et al., "A Method for Quantifying the Color Gamut of an Output Device.", *Proceedings of SPIE, 3018*, 110–116, (Jan. 1997).

Braun, G.J., et al., "Techniques for Gamut Surface Definition and Visualization", *The Fifth IS&T/SID Color Imaging Conference: Color Science, Systems and Application*, Scottsdale, Arizona, Nov. 17–20, 1997., 147–152, (1997).

Edelsbrunner, H., et al., "Three–Dimensional Alpha Shapes", *ACM Transactions on Graphics, 13* (*1*), 43–72, (Jan. 1994).

Herzog, P.G., "Further Development of the Analytical Color Gamut Representation", *Proceedings of SPIE, 3300*, San Jose, California, Jan. 28–30, 1998, 118–128, (1998).

Mucke, E.P., "Shapes and Implementations in Three–Dimensional Geometry", *Thesis for the Degree of Doctor of Philosophy in Computer Science*, Graduate College of the University of Illinois at Urbana–Champaign; University Microfilm International, publ. (Order #9416411), 1–101, (1998).

Rolleston, R., "Visualization of Colorimetric Calibration", *Proccedings of SPIE, 1912 Color Hard Copy and Graphic Arts 11.*, 299–309, (1993).

* cited by examiner

Primary Examiner—Mark Wallerson
(74) Attorney, Agent, or Firm—King & Schikli PLLC

(57) ABSTRACT

The method includes identifying a set of points defining a gamut for a color image or image forming device, selecting a parameter α, and computing the gamut boundary of the color image from the set of points and α using Delaunay triangulation. The system includes a processing unit, a memory, and software operative on the processing unit. The software is capable of identifying a gamut boundary for the image, identifying a gamut boundary for the image forming unit, and calculating the percentage of colors in the image capable of being rendered by the image forming unit from the gamut boundary for the image and the image forming unit. The software is also capable of identifying an alpha shape associated with a color gamut and calculating a color gamut volume. The alpha shape includes a plurality of tetrahedra and each of the plurality of tetrahedra has a volume. The plurality of volumes are summed to generate the color gamut volume.

15 Claims, 9 Drawing Sheets

METHOD AND APPARATUS FOR GAMUT BOUNDARY DETERMINATION

FIELD OF THE INVENTION

This invention relates to images and image forming devices, and more particularly, to determining a gamut boundary for an image or an image forming device.

BACKGROUND OF THE INVENTION

A color gamut is a delimited region in color space, containing colors that are physically realizable by a given device or that are present in a given image. Knowledge of the color gamut surface is useful for many color science-related tasks such as visualization, gamut volume calculation, and deciding how colors outside the color gamut should be reproduced.

Approaches to reconstruction of the gamut surface can be divided into two groups: color space methods, which use the information about the connectivity in a device color space; and geometric methods, which are based only on a set of point coordinates in a device-independent (or colorimetric) color space such as CIELAB or CIECAM97s.

The colorant space methods are based on an assumption that a color space point lies on a surface of the gamut when at least one of the colorant coordinates attains its minimum or maximum value. Such identified surface points can then be connected to form a mesh describing the whole surface of the gamut. The resulting boundaries are called physical boundaries. When there are more than three colorants involved, this usually involves computing the gamuts of the three-colorant subprocesses and then finding their union.

In one method for the reconstruction of a gamut surface, the surface points identified in the colorant space are converted to the cylindrical CIELAB coordinates and projected on the L*h* plane, The points were triangulated using neighborhood information from the colorant space. The obtained gamut surface is represented by a matrix specifying the maximum chroma value attainable for give lightness and hue. This technique assumes that for each point on the gamut boundary there is at most one chroma value for a given combination, which is true for most typical printer gamuts but is not satisfied by some image gamuts. The corners and edges of the gamut may not be represented accurately because of the discrete location of the grid points.

As an alternative to colorant space methods, the geometric approaches work for any number of colorants and without knowledge of the colorant space data or the device model. Therefore they can be used for construction of gamut surfaces for arbitrary data sets such as measurements of targets with unknown underlying colorant specifications or for the set of colors present in an image. Similar to colorant space methods, many color space points are needed to describe the gamut surface precisely.

One geometric approach to the construction of gamut surfaces uses a convex hull of the data set as the gamut surface. Unfortunately, in practice, non-convex (concave) surfaces are common in device gamut boundaries, and the convexity assumption usually leads to an overestimation of the gamut volume.

An approach to fixing this deficiency includes "inflating" the data set before computing its convex hull in such a way that the concave surfaces become convex for the purpose of generating the mesh. The disadvantage of this approach is the heuristic character of the method requiring precise selection of the center point and three parameters. This limits the method's applicability to printer-like gamuts. Over-inflation of the gamut may result in interior points being identified as surface points.

For these and other reasons there is a need for the present invention.

SUMMARY OF THE INVENTION

In one embodiment of the invention, a method for finding a gamut boundary of a color image includes several operations. A set of points defining a gamut of the color image is identified. A parameter α for an alpha-shape is selected, and the gamut boundary of the color image is computed from the set of points and α. Computing the gamut boundary of the color image from the set of points and the α includes finding a Delaunay triangulation of a set of points such that for each of the plurality of tetrahedrons included in the α-shape its circumsphere does not contain points from the set of points.

In an alternate embodiment of the invention, an apparatus includes a processing unit, a memory unit coupled to the processing unit, and a software means operative on the processing unit. The software means, in one embodiment, is capable of calculating a color gamut volume from a color gamut. For the purpose of calculating the color gamut volume, the software means comprises the operations of identifying an alpha shape having a plurality of tetrahedra associated with the color gamut and summing the volumes of the plurality of tetrahedra.

In an alternate embodiment, the software means includes operations capable of finding the percentage of colors in an image that can be rendered by an image forming unit. The software means calculates this percentage by identifying the volume of the intersection of the image gamut and the image forming unit gamut. This volume is divided by the volume of image gamut to obtain the percentage of colors in the image that are also capable of being rendered by the image forming unit.

Various means for practicing the invention and other advantages and novel features thereof will be apparent from the following detailed description of illustrative embodiments of the invention.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
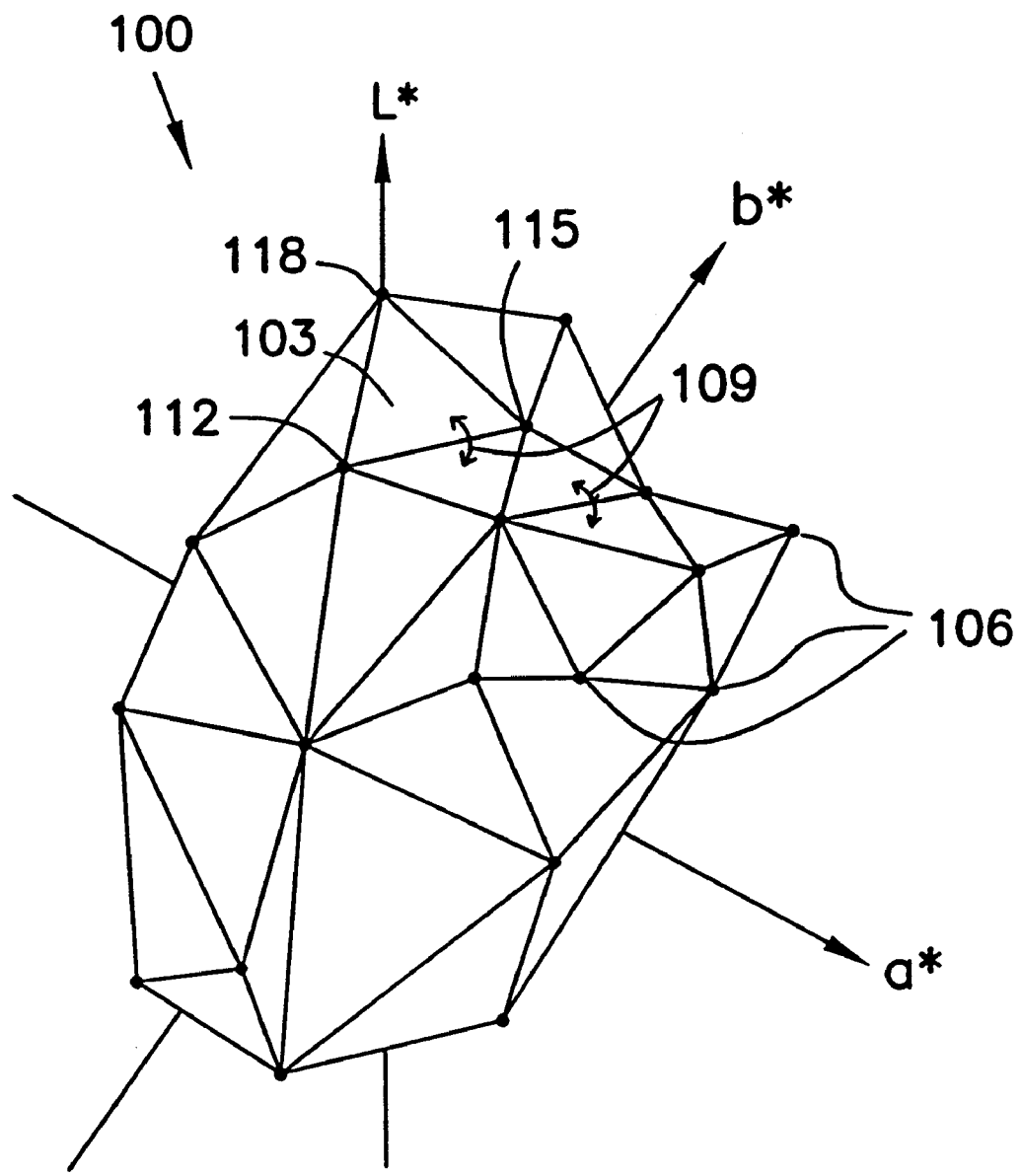
FIG. 1 is an illustration of one embodiment of an α-shape formed from a set of color image data points in the CIELAB color space.

FIG. 1 is an illustration of one embodiment of an $\alpha$-shape 100 formed from a set of color image data points in the CIELAB color space. An $\alpha$-shape formalizes the notion of "shape" for a spatial set of points. Methods for constructing $\alpha$-shapes are described in the paper by H. Edelsbrunner and E. P. Müicke entitled "Three-Dimensional Alpha Shapes", published in the *ACM Transactions on Graphics,* 13:43–72, 1994 and U.S. Pat. No. 5,850,229, issued Dec. 15, 1998, entitled "Apparatus and Method for Geometric Morphing", which are hereby incorporated by reference. $\alpha$-shape 100 includes a plurality of triangular surface areas 103, and a plurality of surface points 106. Each set of three surface points, such as surface points 112, 115, and 118, define a triangle. And each set of three surface points, when combined with a point interior to $\alpha$-shape 100, are capable of defining a tetrahedron. Once a color image is resolved into a multi-dimensional set of points in a particular color space, such as the CIELAB color space, a family of $\alpha$-surfaces are derivable from the multi-dimensional set of points. A method and apparatus for selecting an $\alpha$-surface forming a boundary of a color gamut and for applying the color gamut boundary to color printing problems are described below.

Figure 2:
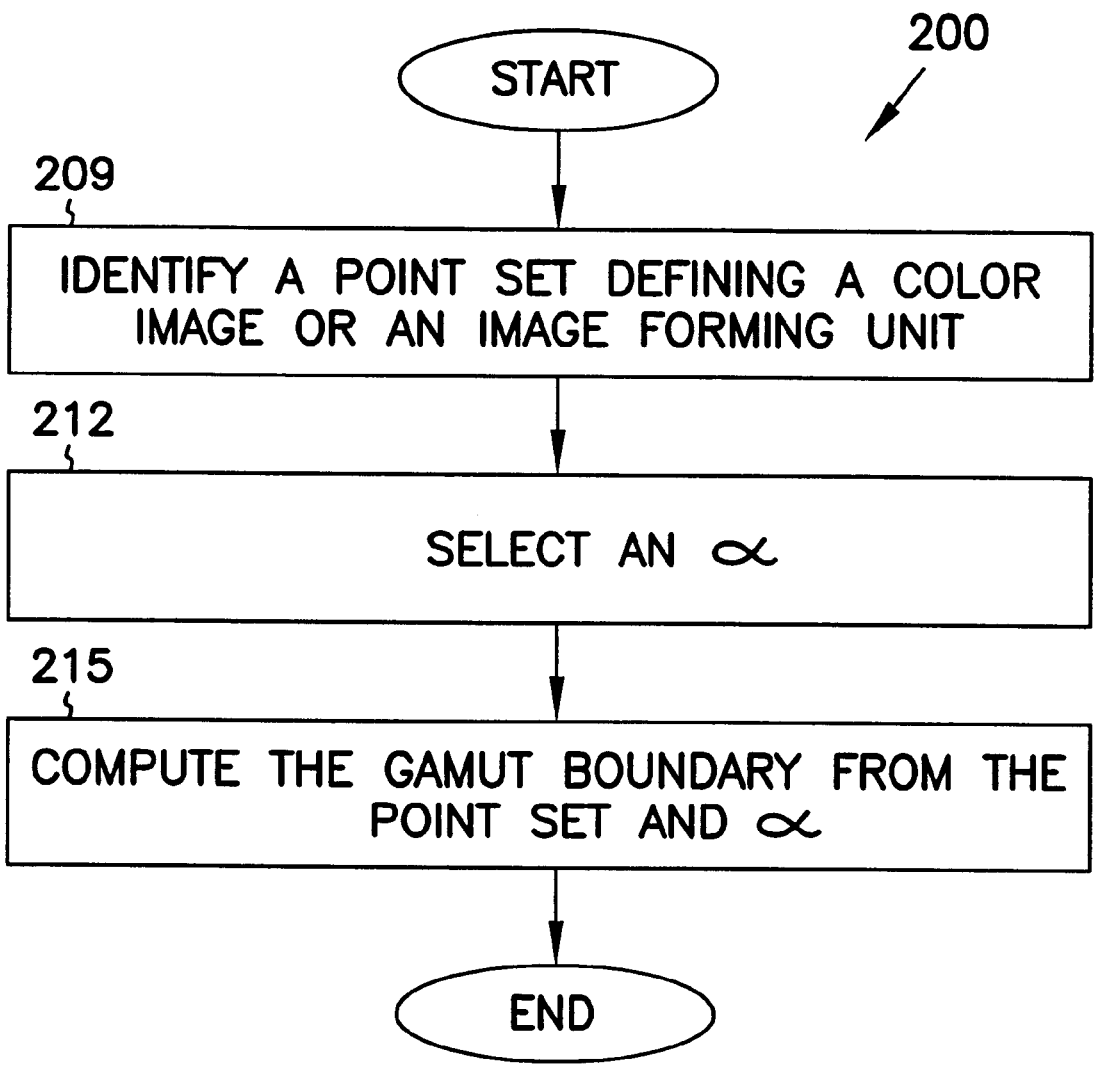
FIG. 2 is a high level flow diagram of one embodiment of method for computing a gamut boundary for a color image.
Figure 3A:
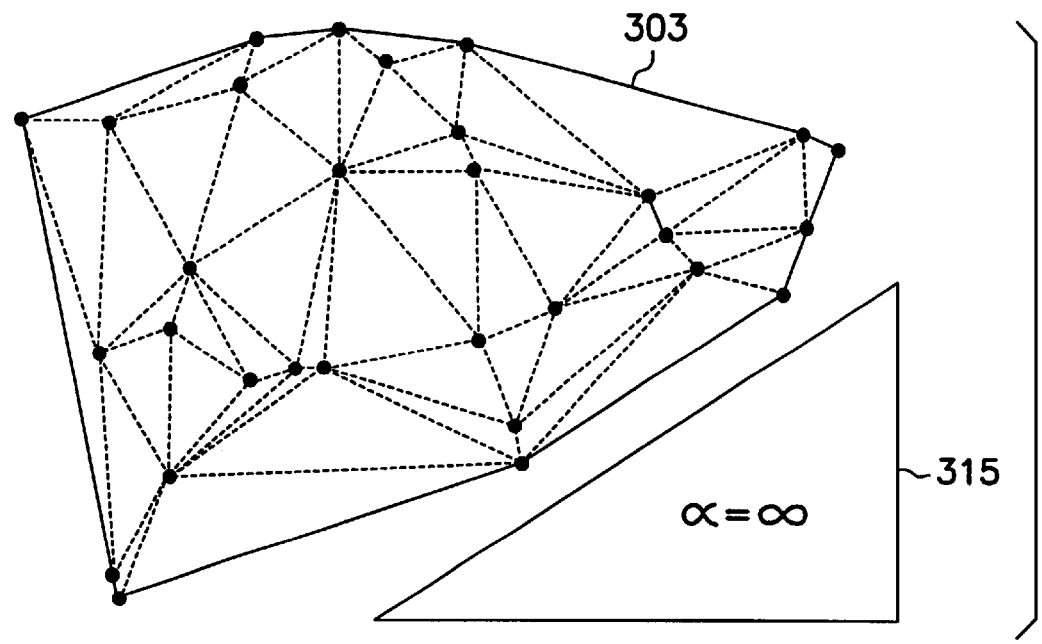
FIGS. 3A, 3B, 3C, and 3D show a family of alpha-shapes for different values of alpha.
Figure 3B:
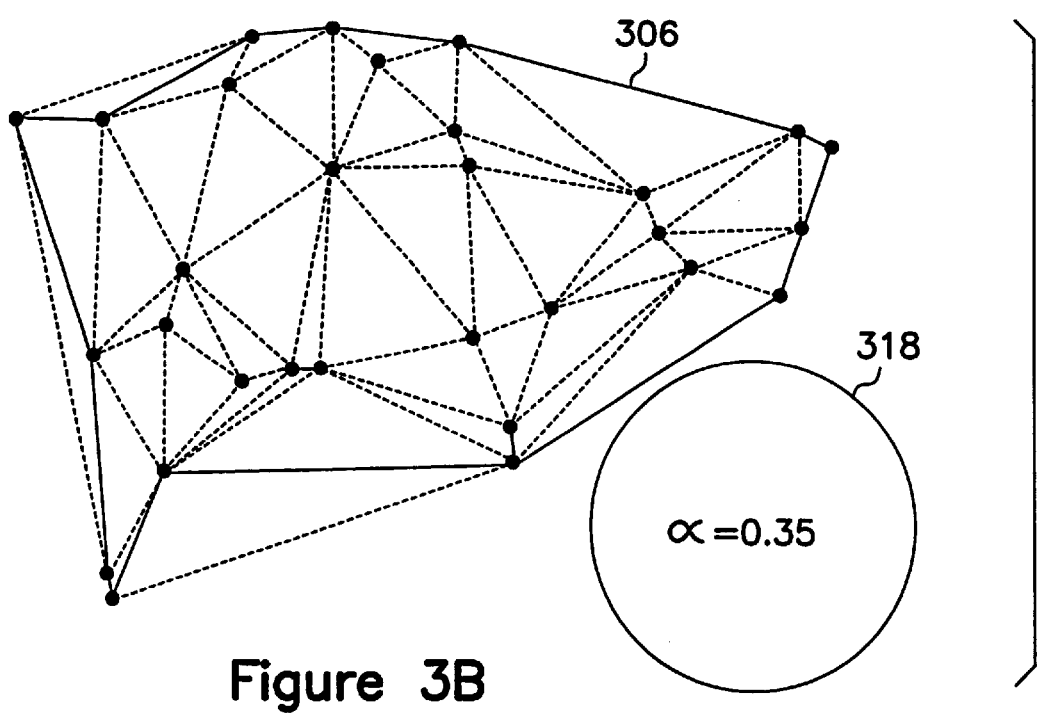
Figure 3C:
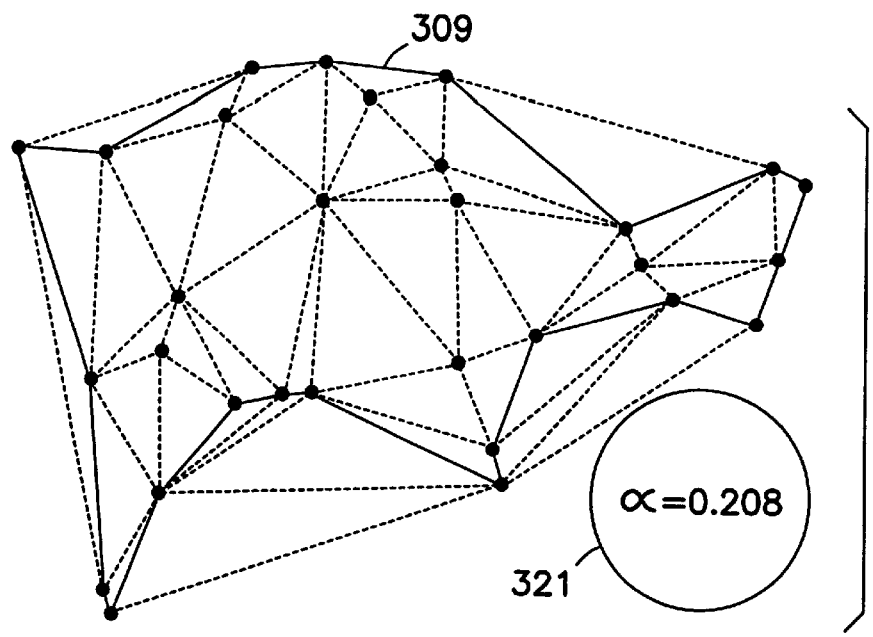
Figure 3D:
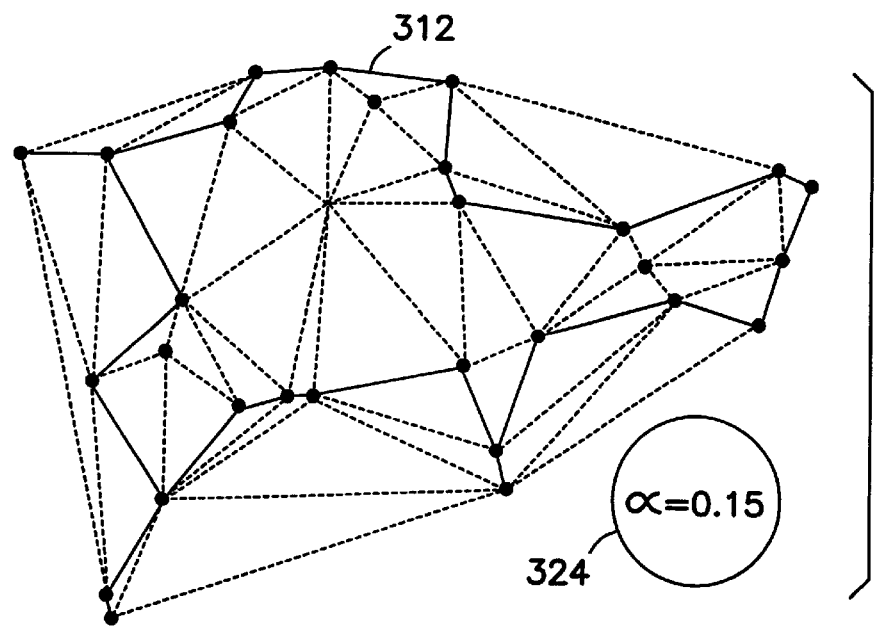

FIG. 2 is a high level flow diagram of one embodiment of method 200 for computing a gamut boundary for a color image. Method 200 is also suitable for use in computing a gamut boundary for an imaging unit, such as a printer, a liquid crystal display, a plasma display, or a cathode ray tube display.

The identifying 209 operation, in one embodiment, identifies a set of points that defines a color image in a color image space, such as the RGB or CIELAB color space. Processes are known in the art for resolving a color image into a set of points in a color image space. For example, to resolve a color image into a set of points in the RGB color space, a process for filtering red, green, and blue is employed to identify values for the amount of red, green, and blue present in each pixel of the color image. These values, when plotted for each pixel in a three-dimensional RGB color space, represent the color gamut of the image, which is the set of points that define the color image in the RGB color space. The set of points identified includes at least four points capable of forming a tetrahedron. After identifying the set of points, an $\alpha$ is selected to define an $\alpha$-shape for the color gamut.

The selecting 212 operation, in one embodiment, selects an $\alpha$ for generating an $\alpha$-shape. $\alpha$ is a real number between zero and infinity, which defines an $\alpha$-shape for the set of points identified in the identifying 209 operation. $\alpha$ determines the level of detail in the surface of the $\alpha$-shape. The $\alpha$-shape obtained for $\alpha$ equal to zero is the set of points, and the $\alpha$-shape obtained for $\alpha$ equal to infinity is a convex hull. For an $\alpha$ between zero and infinity, the $\alpha$-shapes evolve from shapes having holes and a greater amount of surface detail to shapes having no holes and a lesser amount of surface detail. Displaying, plotting, or printing the $\alpha$-shape is useful for assisting in the selection of an $\alpha$ along the real number continuum that provides a suitable approximation to the color gamut surface.

The computing 215 operation, in one embodiment, computes the gamut boundary of the color image or image forming device from the set of points obtained in the identifying 209 operation and the alpha generated in the selecting 212 operation. The computation of the $\alpha$-surface starts with finding the Delaunay triangulation of the point set, which is a triangulation of the points in the point set such that no tetrahedron contains in its circumsphere a point contained in the point set. This results in a set of tetrahedra and convex hull triangles. Each face triangle of each tetrahedron is shared by exactly two tetrahedra or is a convex hull triangle bounding one tetrahedron. A triangle is included in the $\alpha$-surface when the value of $\alpha$ is between the values of the radii of the smallest circumspheres for neighboring tetrahedra.

Sorted radii of the smallest circumspheres of all tetrahedra form an $\alpha$-spectrum. As $\alpha$ is increased, the $\alpha$-shape changes only at values belonging to the $\alpha$-spectrum. It is therefore possible to create an ordered collection of $\alpha$-shapes. In the ordered collection, $\alpha$-rank denotes an index of a specific $\alpha$-shape.

FIGS. 3A, 3B, 3C, and 3D show a family of alpha-shapes 303, 306, 309, and 312. In each of the alpha-shapes 303, 306, 309, and 312 a dashed line shows the Delaunay triangulation for the set of points and a thick line shows the edge component of the alpha-shape. Associated with each of the alpha-shapes 303, 306, 309, and 312 is an alpha value illustrated by disks 315, 318, 321, and 324, respectively. Each of the disks 315, 318, 321, and 324 has a diameter approximately equal to the alpha value associated with the associated alpha-shape. For example, alpha-shape 303 has an alpha equal to infinity, disk 315 is a half-plane, and alpha-shape 303 is identical to a convex hull.

Figure 4:
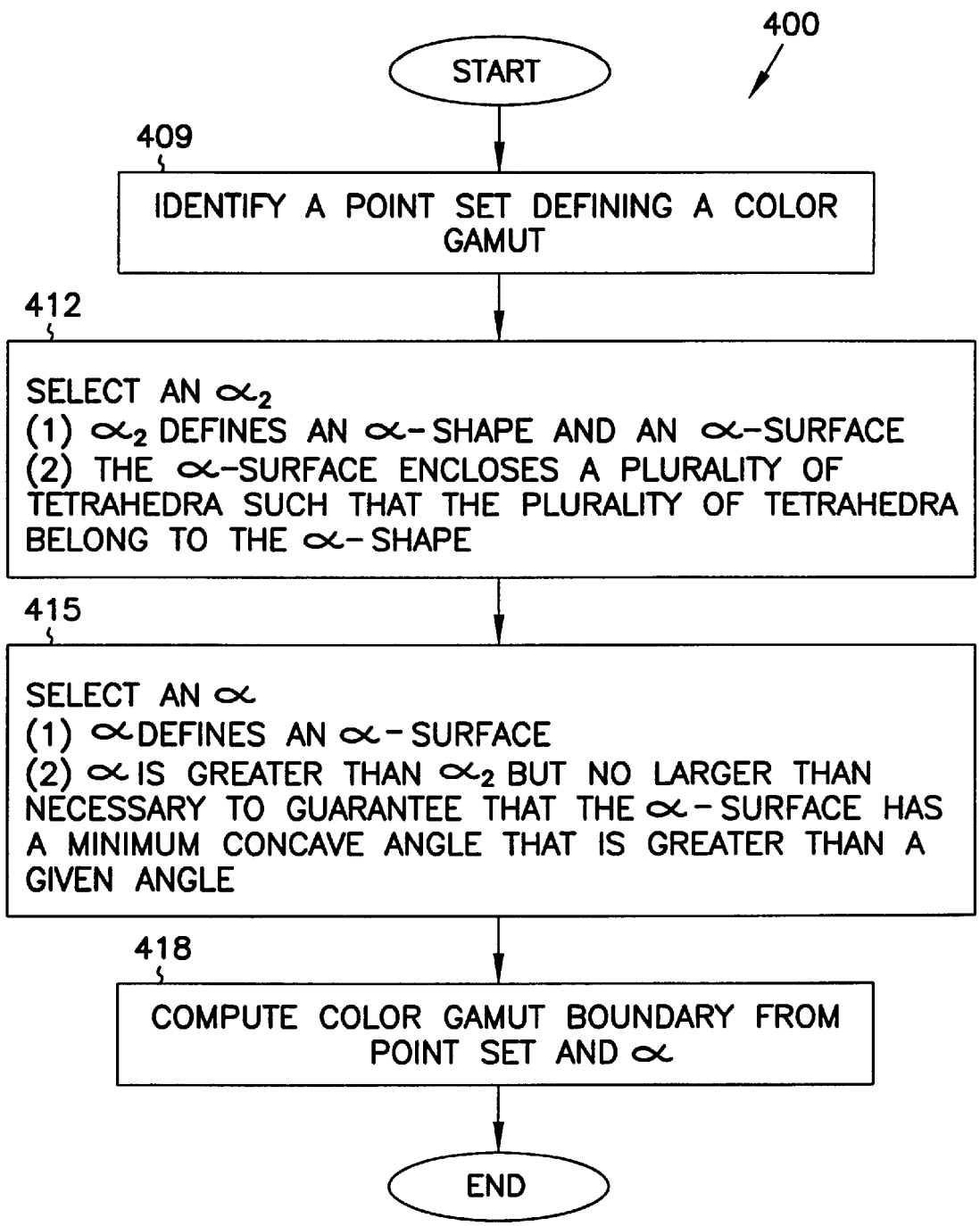
FIG. 4 is a detailed flow diagram of one embodiment of a method for computing a color gamut boundary for a color image.

FIG. 4 is a detailed flow diagram of one embodiment of a method for computing a color gamut boundary for a color image.

The identifying 409 operation identifies a point set defining a color gamut. The point set is derived from an image or an image forming unit, such as a printer, a color plasma display, a cathode ray tube display, or a scanner. A point set for an image is all the points in a color space that comprise the image. A point set for an image is identified as described above with reference to the identifying 209 operation of FIG. 2. A point set for a device is the set of all possible colors in a color space that the device is capable of printing or displaying. For example, in a CMYK printer the point set is obtained by forming all combinations of cyan, magenta, yellow, and black that the printer is capable of printing. Sufficient accuracy can be usually obtained with just a subset of all possible combinations.

The selecting $\alpha_2$ 412 operation, in one embodiment, includes selecting an $\alpha_2$ that defines an $\alpha_2$-shape and an $\alpha_2$-surface. The $\alpha_2$-shape is free of holes, and the $\alpha_2$-surface tends more towards smoothness than roughness. A first approximation to $\alpha_2$ is obtained by applying the condition that all tetrahedra enclosed by the $\alpha_2$-surface belong to the $\alpha_2$-shape. The $\alpha_2$-surface obtained for this selection of $\alpha_2$ is sometimes unnecessarily ragged as a result of removing many tetrahedra located close to the surface.

The selecting $\alpha$ 415 operation, in one embodiment, comprises selecting an $\alpha$ that defines an $\alpha$-surface. However, too large a value for $\alpha$ results in an overestimation of the $\alpha$-surface and the $\alpha$-gamut volume by hiding some concavities in the $\alpha$-surface. Therefore, the selected $\alpha$ is the smallest value of $\alpha$ which is greater than $\alpha_2$ and which guarantees that the minimum concave angle on the $\alpha$-surface is larger than a preset angle. This approach does not guarantee that there are no tunnels in the resulting surface, but tunnels are not a problem for relatively evenly distributed point sets.

The computing 418 operation includes computing a color gamut boundary from a point set and $\alpha_1$ using Delaunay triangulation, as described above with reference to the computing 215 operation in FIG. 2.

Figure 5:
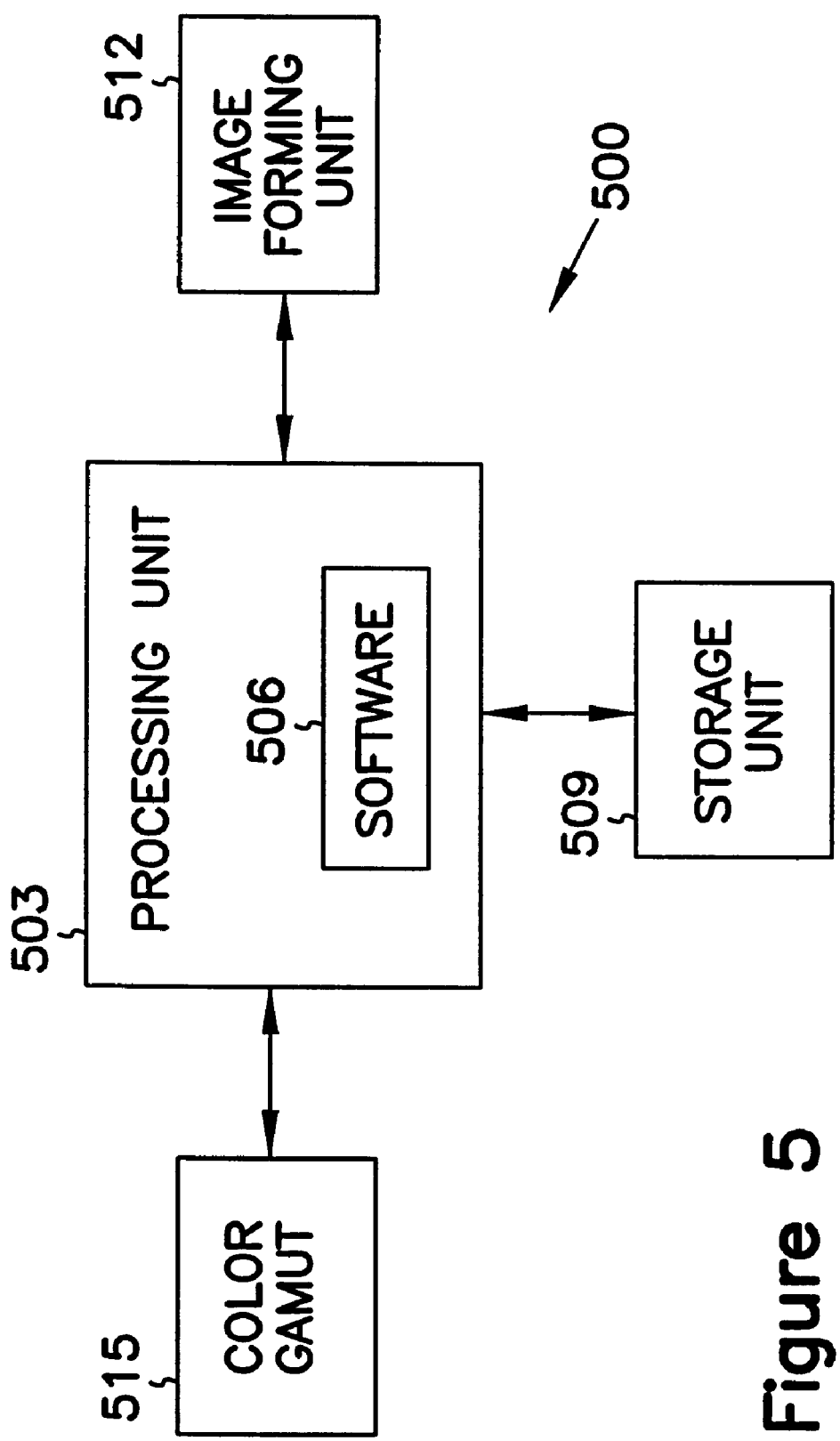
FIG. 5 is a block diagram of one embodiment of an apparatus for computing the volume of a color gamut and identifying the percentage of colors in an image that can be rendered by an image forming unit.

FIG. 5 is a block diagram of one embodiment of an apparatus 500 for computing the volume of a color gamut and identifying the percentage of colors in an image that can be rendered by an image forming unit. Apparatus 500 includes processing unit 503, software means 506, storage unit 509, and image forming unit 512. Processing unit 503 is coupled to storage unit 509 and image forming unit 512. Software means 506 is operative on processing unit 503. Color gamut surface description 515 is an input to processing unit 503.

Processing unit 503 is not limited to a particular type of information processor. Processing units suitable for use in connection with the present invention include microprocessors, mainframe processors, mid-range processors, reduced instruction set processors, parallel processors, and massively parallel processors.

Storage unit 509 is not limited to a particular type of storage unit. In one embodiment, storage unit 509 is a solid state memory. Alternatively, storage unit 509 is a magnetic memory. In still another alternate embodiment, storage unit 509 is an optical memory.

Image forming unit 512 is not limited to a particular type of image forming unit. In one embodiment, image forming unit 512 is a color image forming unit, such as a color ink jet printer or a color laser printer. Alternatively, image forming unit 512 is a display device, such as a CRT, a plasma display, a liquid crystal display, or a holographic display. In still another alternate embodiment, image forming unit 512 is an image capture device, such as a color scanner.

Figure 6:
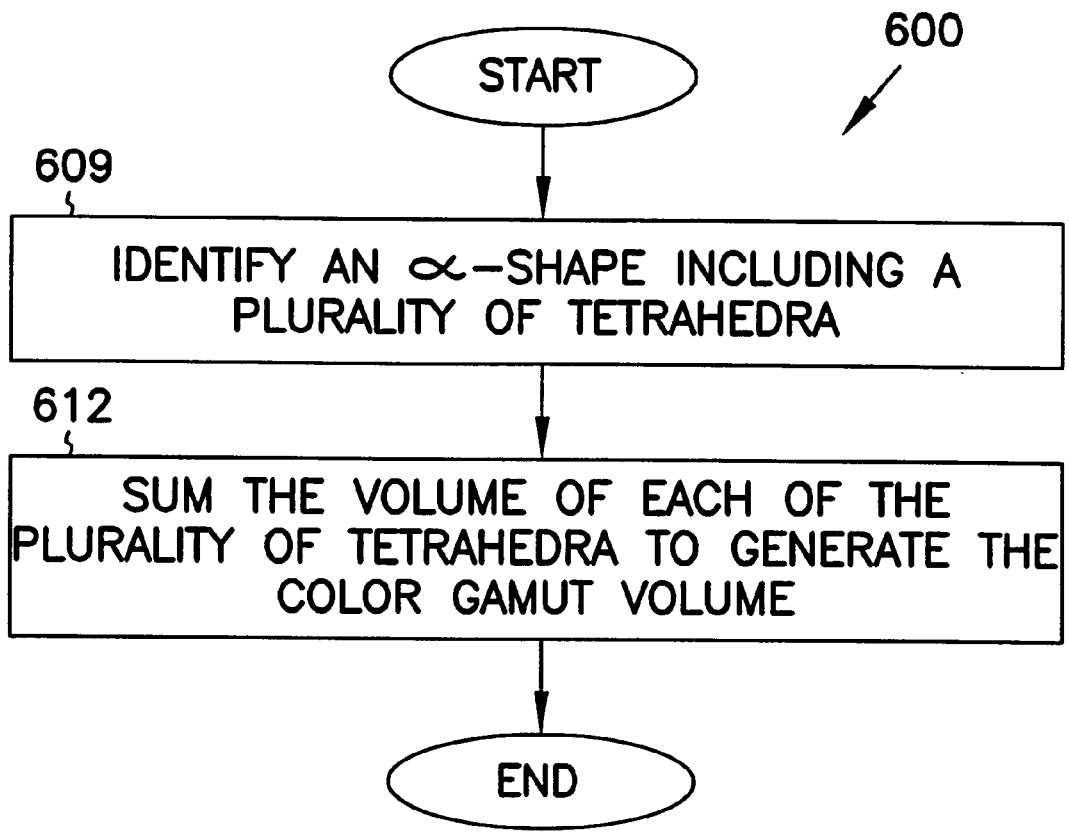
FIG. 6 is a flow diagram of one embodiment of a method for computing the volume of the color gamut for an image or an image forming unit.

Software means 506, in one embodiment, performs the operations of method 600 shown in the flow diagram of FIG. 6. FIG. 6 is a flow diagram of a method for computing the volume of a color gamut of an image or the color gamut of an image forming unit. After the start 503 operation method 600 includes an identifying 609 operation and a summing 612 operation. The identifying 609 operation includes identifying an $\alpha$-shape and a plurality of tetrahedra that fill the volume of the $\alpha$-shape. One embodiment of a method for identifying an $\alpha$-shape and a plurality of tetrahedra from a point set is described above with reference to FIG. 4. The summing 609 operation includes summing the volume of each of the plurality of the tetrahedra to generate the color gamut volume. An advantage of this embodiment is that it does not depend on the existence of a point in the center of the gamut from which all surface triangles are visible. Therefore it can be applied to arbitrary gamut shapes possibly consisting of several disjoint components which are common in the case of image gamuts.

Figure 7:
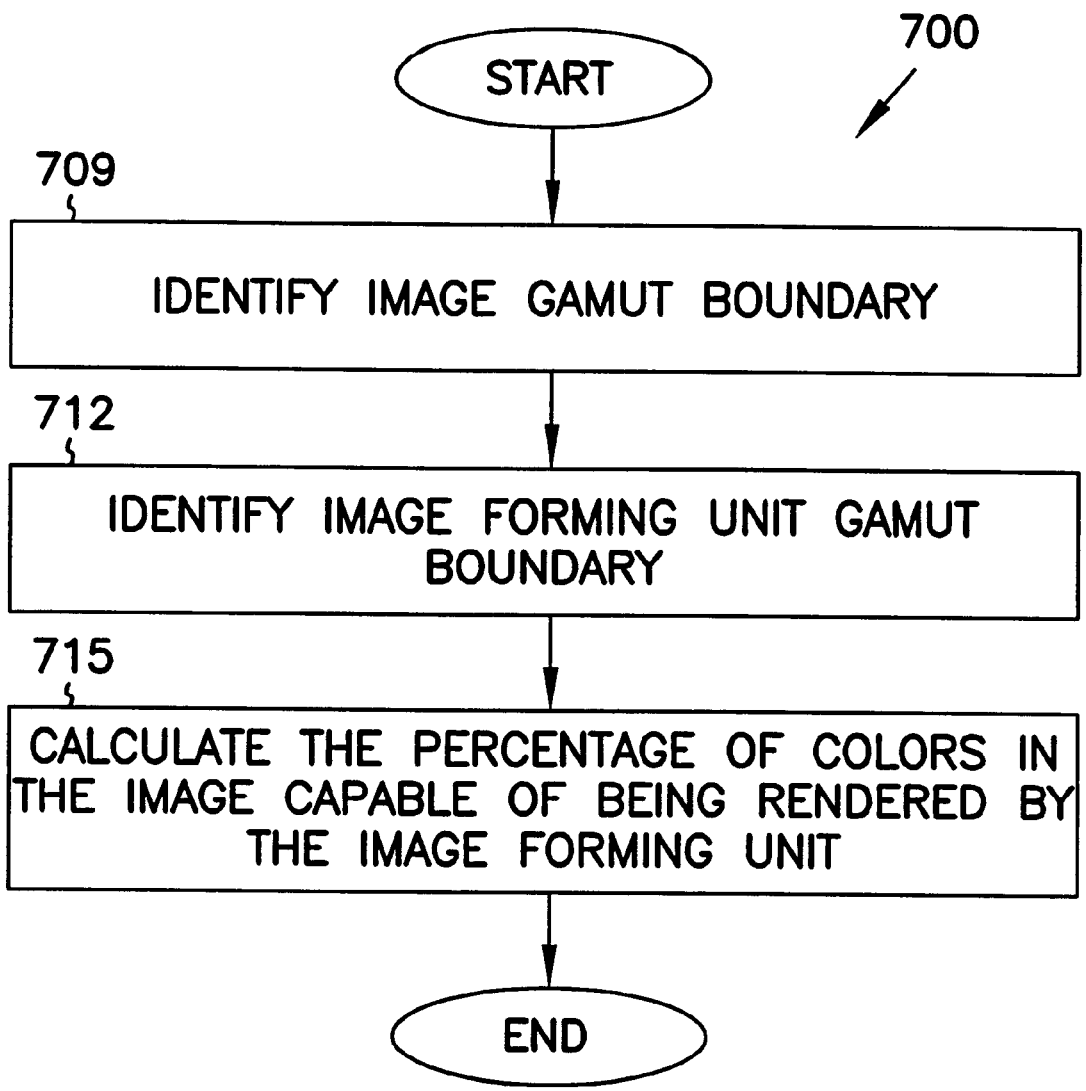
FIG. 7 is a flow diagram of one embodiment of a method for identifying the percentage of colors in an image capable of being rendered by an image forming unit.

In an alternate embodiment, software means 506 performs the operations of method 700 shown in the flow diagram of FIG. 7. FIG. 7 is a flow diagram of a method for identifying the percentage of colors in an image capable of being rendered by an image forming unit. The first 709 operation and the second 712 operation are preferably performed as shown in FIG. 3 and described in the accompanying text. The calculating 715 operation computes the percentage of colors contained in the image forming gamut. The calculating 715 operation includes a first intermediate set of calculations including a calculation of the volume of the image gamut, a calculation of the volume of the image forming unit gamut, and a calculation of the volume of the union of the image gamut and the image forming unit gamut. The second intermediate set of calculations includes summing the volume of the image gamut and the volume of the image forming unit gamut, and reducing the sum by the volume of the union of the image gamut and the image forming unit gamut. The reduced sum is the volume of the intersection of the volume of the image gamut and the image forming unit gamut. Finally, dividing the volume of the intersection by the volume of the image forming device gamut yields the percentage of colors in the image capable of being rendered by the image forming unit.

Figure 8:
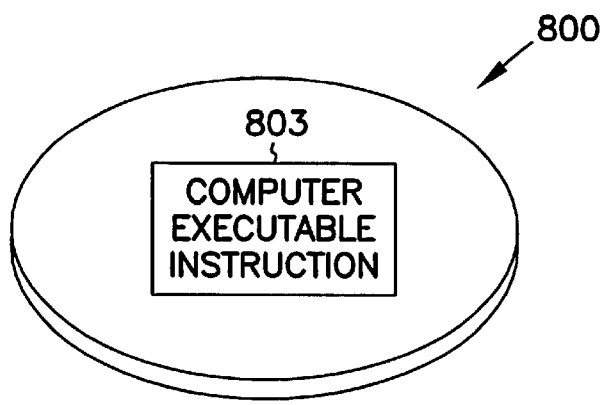
FIG. 8 is an illustration of one embodiment of a computer-readable medium including computer executable instructions.
Figure 9:
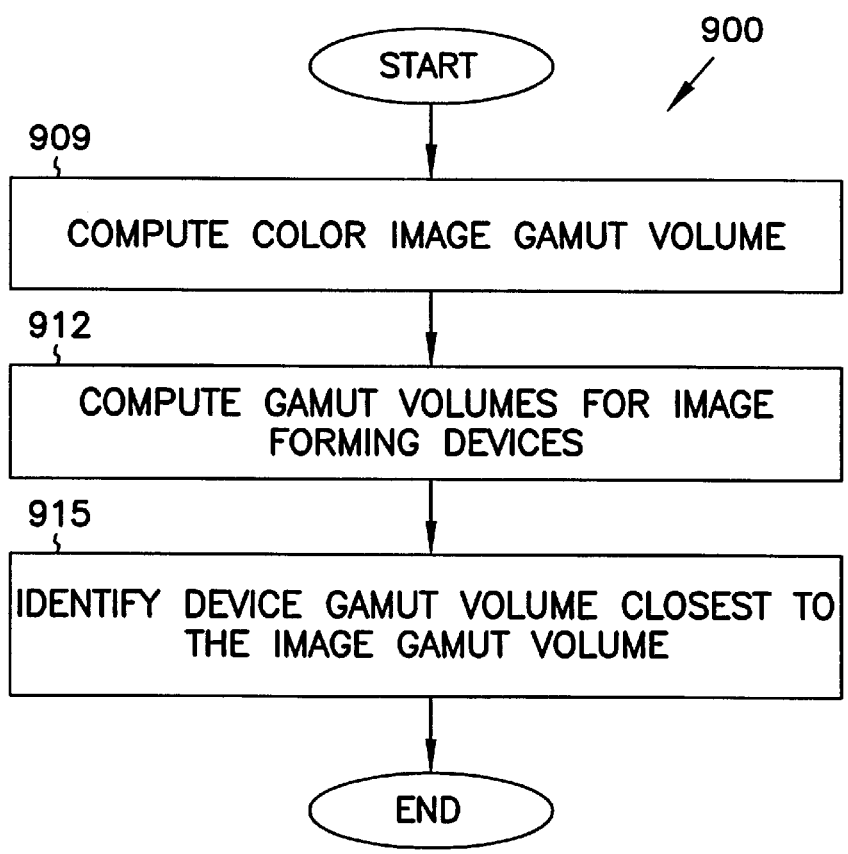
FIG. 9 is a flow diagram of one embodiment of a method for matching a color gamut for an image forming apparatus to a color image gamut.

FIG. 8 is an illustration of one embodiment of a computer-readable medium 800 including computer executable instructions 803. FIG. 9 is a flow diagram of one embodiment of method 900 for matching a color gamut for an image forming apparatus to a color image gamut. The computing 909 operation computes a color image gamut volume. The color image gamut volume, in one embodiment, is computed by identifying an $\alpha$-shape associated with a color gamut. The $\alpha$-shape includes a plurality of tetrahedra and each of the plurality of tetrahedra has a volume. After identifying an $\alpha$-shape associated with the color image gamut volume, the volumes of each of the plurality of tetrahedra are summed to generate the color image gamut volume. The computing 912 operation computes a plurality of gamut volumes, and each of the plurality of gamut volumes associated with an image forming device. The identifying operation 915 identifies one of the plurality of gamut volumes having a gamut volume closest to the color image gamut volume.

Although specific embodiments have been illustrated and described herein, it will be appreciated by those of skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method for finding a gamut boundary of a color image, the method comprising:

identifying a set of points defining a gamut of the color image;

selecting a parameter $\alpha$; and computing the gamut boundary of the color image from the set of points and the parameter $\alpha$ by finding a Delaunay triangulation of the set of points such that in an $\alpha$-shape, including plurality of tetrahedrons, each of the plurality of tetrahedrons includes a circumsphere, and each circumsphere contains only points not contained in the set of points.

2. The method of claim 1, wherein selecting a parameter $\alpha$ comprises:

selecting the parameter $\alpha$ that is a real number greater than zero and less than infinity.

3. The method of claim 1, wherein selecting a parameter α comprises:

selecting the parameter α for the gamut capable of defining an α-surface enclosing a plurality of tetrahedra and an α-shape such that the plurality of tetrahedra belong to the α-shape.

4. A method for finding a gamut boundary of an image forming device, the method comprising:

identifying a set of points defining a gamut of the image forming device;

selecting a parameter α and a parameter $\alpha_2$ for the gamut, the parameter $\alpha_2$ defining an α-shape and an α-surface enclosing a plurality of tetrahedra such that the plurality of tetrahedra belong to the α-shape; the parameter α defining a second α-surface, the parameter α is greater than the parameter $\alpha_2$, and the parameter α is no larger than necessary to guarantee that the α-surface has a minimum concave angle that is greater than a given angle; and computing the gamut boundary of the image forming device from the set of points and the parameter α.

5. A method for selecting an α for use in computing a boundary of a gamut comprising:

selecting a parameter α and a parameter $\alpha_2$ for the gamut, the parameter $\alpha_2$ defining an α-shape and an α-surface enclosing a plurality of tetrahedra such that the plurality of tetrahedra belong to the α-shape; the parameter α defining a second α-surface, the parameter α is greater than the parameter $\alpha_2$, and the parameter α is no larger than necessary to guarantee that the α-surface has a minimum concave angle that is greater than a given angle.

6. Apparatus for calculating a color gamut volume from a color gamut comprising:

a processing unit;

a memory unit coupled to the processing unit; and a software means operative on the processing unit for:

identifying an alpha shape associated with the color gamut, the alpha shape having a plurality of alpha surfaces deriving their shape based upon a real number parameter alpha greater than zero and less than infinity wherein a relatively low parameter alpha corresponds to a less convex shape than a relatively high parameter alpha, the alpha shape including a plurality of tetrahedra each having a volume and being defined by one of the alpha surfaces and a point interior to the alpha shape; and summing the volume of each of the plurality of tetrahedra to generate the color gamut volume.

7. The apparatus of claim 6, wherein the memory unit is a solid-state memory.

8. Apparatus for finding a percentage of colors in an image having a gamut and capable of being rendered by an image forming unit, the apparatus comprising:

a processing unit;

a storage unit coupled to the processing unit; and a software means operative on the processing unit for:

identifying a gamut boundary for the image;

identifying a gamut boundary for the image forming unit;

calculating the percentage of colors in the image capable of being rendered by the image forming unit from the gamut boundary for the image and the gamut boundary for the image forming unit by computing a first gamut volume associated with the gamut boundary of the image;

computing a second gamut volume associated with the gamut boundary of the image forming unit;

computing an intersection volume for the first gamut volume and the second gamut volume; and dividing the intersection volume by the first gamut volume.

9. The apparatus of claim 8, wherein the processing unit is a microprocessor.

10. The apparatus of claim 8, wherein the image forming unit is a color image forming unit.

11. The apparatus of claim 8, wherein the image forming unit is a color ink jet printer.

12. The apparatus of claim 8, wherein the image forming unit is a color laser printer.

13. The apparatus of claim 8, wherein computing a first gamut volume associated with the gamut boundary of the image comprises:

identifying an α-shape associated with the gamut, the α-shape including a plurality of tetrahedra and each of the plurality of tetrahedra having a volume; and summing the volume of each of the plurality of tetrahedra to generate the first gamut volume.

14. A computer-readable medium having computer-executable instructions for performing a method comprising:

computing a color image gamut volume;

computing a plurality of gamut volumes, each of the plurality of gamut volumes associated with one of a plurality of image forming devices wherein the computing the plurality of gamut volumes for said each of the plurality of gamut volume includes identifying an α-shape associated with a color gamut, the α-shape including a plurality of tetrahedra and each of the plurality of tetrahedra having a volume; and summing the volume of each of the plurality of tetrahedra to generate the color image gamut volume; and identifying one of the plurality of gamut volumes having a gamut volume closest to the color image gamut volume.

15. A method for finding a gamut boundary of a color image, the method comprising:

identifying a set of points larger than three in number defining a gamut of the color image;

selecting a parameter α for generating an α-shape having a plurality of α-surfaces wherein each of the α-surfaces is defined by at least three of the set of points and the α-shape fits the set of points and bounds other points not included in the set of points, the parameter α is a real number greater than zero and less than infinity and a relatively low parameter α corresponds to an α-shape less convex than a relatively high parameter α; and computing the gamut boundary of the color image from the set of points and the parameter α.

* * * * *